United States Patent [19]

Wenstrand et al.

[11] Patent Number: 5,690,055
[45] Date of Patent: Nov. 25, 1997

[54] TABLE-TOP INCUBATOR

[76] Inventors: Thomas W. Wenstrand, 1702 Oakland Mills Rd., Mt. Pleasant, Iowa 52641; Allen Watson, 300 West Jackson St., Salem, Iowa 52649

[21] Appl. No.: 701,998

[22] Filed: Aug. 26, 1996

[51] Int. Cl.⁶ .......................... A01K 41/00; A01K 41/06
[52] U.S. Cl. .......................................... 119/309; 119/323
[58] Field of Search .................................. 119/309, 306, 119/307, 308, 305, 318, 321, 323, 324, 326

[56] References Cited

U.S. PATENT DOCUMENTS

| | | | |
|---|---|---|---|
| 3,543,726 | 12/1970 | Marsh | 119/324 X |
| 3,669,075 | 6/1972 | Marsh | 119/323 |
| 3,783,832 | 1/1974 | Marsh | 119/323 X |
| 4,215,651 | 8/1980 | Pearce | 119/323 |
| 5,148,773 | 9/1992 | Ontiveros | 119/323 X |

*Primary Examiner*—Gene Mancene
*Assistant Examiner*—Yvonne Abbott

[57] ABSTRACT

A small incubator designed to hatch a small number of eggs of chickens, game birds or the like. The incubator is designed to be used on a table top or similar stand, and includes a device for rolling the eggs as well as a heating unit and circulating device to move the air inside the egg compartment. The rolling device may be either manual or automatic as desired.

13 Claims, 1 Drawing Sheet

TABLE-TOP INCUBATOR

BACKGROUND AND SUMMARY OF THE INVENTION

This invention pertains to devices adapted to keep fertile bird eggs warm and periodically turn them in order to cause the eggs to hatch.

Incubators for the artificial hatching of eggs are of long-time use. Large incubators for chicken eggs and for other commercial poultry are well-known and have been used for many years.

At times it may be desirable to hatch small numbers of eggs for a variety of reasons. Particularly, hobby raisers of certain varieties of chickens and other poultry may wish to raise only small numbers of birds for show purposes. Game breeders may desire a relatively small number of birds of a variety of game species for release into the field. Science teachers may use a small number of eggs to demonstrate to pupils the process of reproduction of birds, and scientists may use the device to raise embryos and young poultry for scientific experiments. All of these applications require only a relatively small number of hatched eggs and an appropriately small incubator for the hatching process.

There are now in use, certain small units designed for the purposes noted. Many of those are simple containers having a source of heat such as an incandescent electric bulb. Most of those units use an exposed bulb; some, but not all, provide some sort of fan for circulation of the warm air, and all regularly require manual turning of the eggs, although automatic turners may be added.

By the present invention, applicant provides a single compact unit designed for a relatively small number of eggs. The heating unit includes a compact assembly for a guarded heat source and circulation unit to provide the needed warmth for hatching. A swing platform having stationary bars extending across it provides for turning the eggs, and a motor and crank arrangement may be used to provide for an automatic rolling of the eggs.

DESCRIPTION

Figure 1:
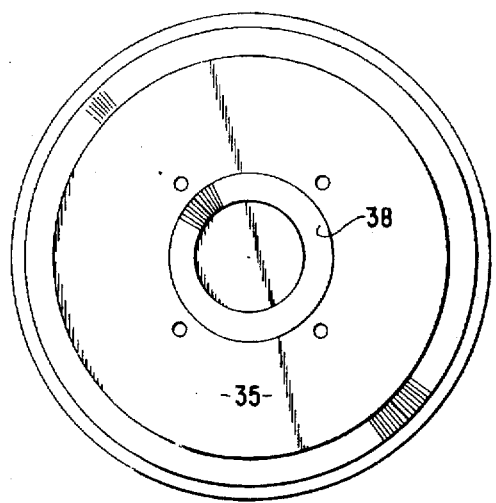
FIG. 1 is a top plan view of the incubator with the cover in place.
Figure 2:
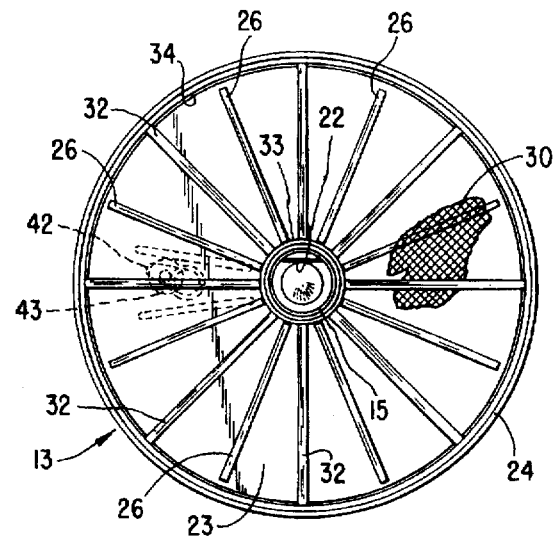
FIG. 2 is a view similar to FIG. 1 with the cover removed.
Figure 3:
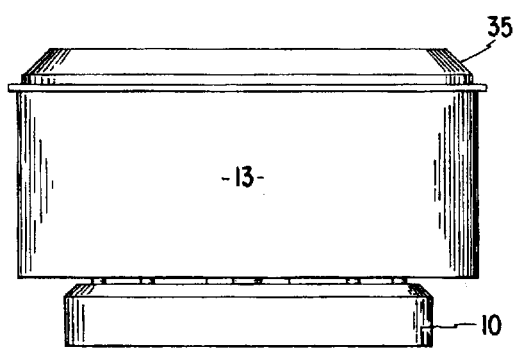
FIG. 3 is an elevational view of the device of FIG. 1.

Briefly this invention comprises a small incubator designed for tabletop use. The incubator includes a novel heating and circulation tower and a novel arrangement for the turning of the eggs during incubation.

More specifically and referring to the drawings, the incubator is designed to stand on a base 10 adapted for placement on a table or the like. The base includes a series of posts 11 upon which the principal container 13 is slidable disposed. The heating and circulation tower 14 is also mounted on the base 10.

The tower 14 contains most of the functional parts of the incubator. In essence, it consists of a tubular housing 15 on the base 10 within which is located heating, circulation and control functions. The heating is provided principally by an incandescent bulb 17 held by a suitable socket member 18. Beneath the socket is mounted a small fan 19 and its motor which are adapted to blow air upward past the bulb 17 to provide for circulation of the warmed air throughout the incubator chamber. Any desired electrical controls and voltage devices for the small motors—of both the fan 19 and a crank motor 20 to be later described—are mounted in a small control board 22 within the tower housing 15. Power to that board 22 may be supplied by means well known in the art such as a power cord (not shown) from a source of electric power which will usually be 110 volt or 220 volt power.

The tower 14 is preferably made of an insulating material such as poly carbonate. Thus, the tower forms a chimney-like structure which allows the warmed air to rise within the tower to assist the circulation. Circulation is highly desirable to provide as nearly homogeneous temperatures as possible. This circulation is assured by the combination of convection from the heated air in the tower and by the fan 19. Adequate openings at the top and bottom of the tower 14 are provided to allow adequate circulation. This requires that the total open area at the base of the tower 14 equal or be greater than that of the openings at the top.

The principal container 13 consists of a deep pan shaped device having a floor 23 and a cylindrical wall 24. The floor includes an opening through which the tower 14 can rise so that the container floor 24 will rest on the posts 11 on the base. Thus, the container 13 can be rotated about the tower while sliding on the posts. A trough 25 may be formed at the juncture between the wall 24 and floor 23. The trough thus provides a stiffening and strengthening structure for the container. Further strengthening and stiffening is provided by a series of radial ribs 26 on the upper side of the floor 23.

These ribs 26 also provide support for a screen egg support floor 30. This support floor simply rests on the ribs 26 and is adapted to hold the eggs spaced from the container floor 23 so that warmed air can circulate around them. Preferably, the screen is not fastened to the ribs for ease in disassembly for cleaning purposes. However, friction between the screen 30 and the ribs 26 normally provides that the screen is moved with those ribs as the container 13 is moved.

Figure 6:
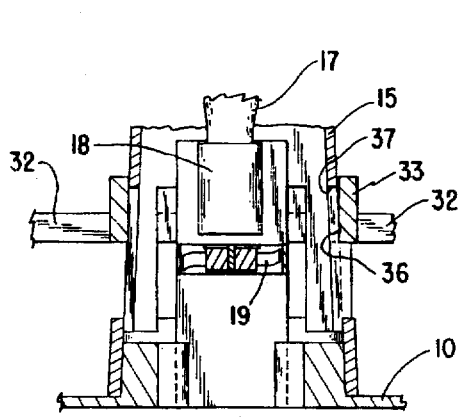
FIG. 6 is a sectional view to an enlarged scale from line 6—6 of FIG. 5.

Above the screened floor 30 lies a wheel 31 having spokes 32 radiating from a hub 33 to a rim 34. The rim 34 is supported by the spokes 32 and is slightly spaced from the walls 24 of the container 13. The hub 33 incudes a key formation 36 (FIG. 6) adapted to engage slots 37 in the tower housing 15. Also, this hub 23 has an opening of a size to fit over the housing 15. If that housing is formed as a frustum of a cone as is preferred, and as shown, then the diameter of the hub opening can be selected to support the wheel at a level just above the screen 30 so that the wheel can be held stationary above the container and not drag on the screen. It will be apparent that the tower could be formed with other well known devices to support the hub 33. Such devices might include extrusions on a ring or a shoulder on a cylindrical tower to support the hub. Such devices are well known to those skilled in the art.

It will be noted that the hub 33 extends in only one direction from the spokes 32. In the illustrated position in FIG. 4, the spokes lie near the screen 30 and thus are adapted to engage and roll small eggs. However, if the wheel 31 is inverted so that the extended hub 33 holds the spokes 32 well spaced from the screen 30, the spokes will be in position to turn larger eggs. Thus a single wheel having the non-symmetrical hub may be useful with a variety of sizes of eggs.

A cover 35 for the container is also necessary to hold the heat within the container. This cover is preferably snug fitting with the container and may have a rim 36 adapted to set on the walls 24 of the container. Preferably a large dimple 38 is formed in the cover both for strength reasons and to provide an interior cone surface which will tend to distribute warmed air from the tower 14 to all parts of the container more evenly then otherwise might be the case.

In use, the container 13 with the screen floor 30 on its support ribs 26 is set in place on the base 10. The wheel 31 is then placed over the tower 14 and is arranged so that it will not turn relative to that tower. The eggs which are to be hatched are then set onto the screen 30 and between the spokes 32. The cover 35 then is used to close the container. At this point, the power can be turned on so that air warmed by the bulb 17 and distributed by the fan 19 will fill the container and warm the eggs. To simulate the normal turning of eggs in the nest by the female bird, it is only necessary to turn the container 13 on the base 10. By this turning, the screen 30 is carried under the eggs which are held in place by the spokes 32 and they will simply roll relative to the screen and thus be turned. That turning can be done periodically during the incubation cycle until the eggs are ready to hatch.

Figure 4:
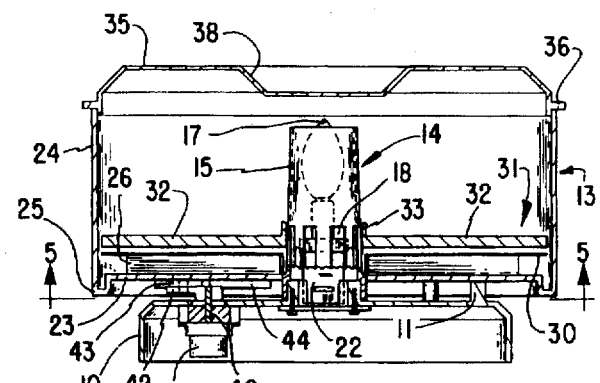
FIG. 4 is a medial sectional view of the incubator of FIG. 1.
Figure 5:
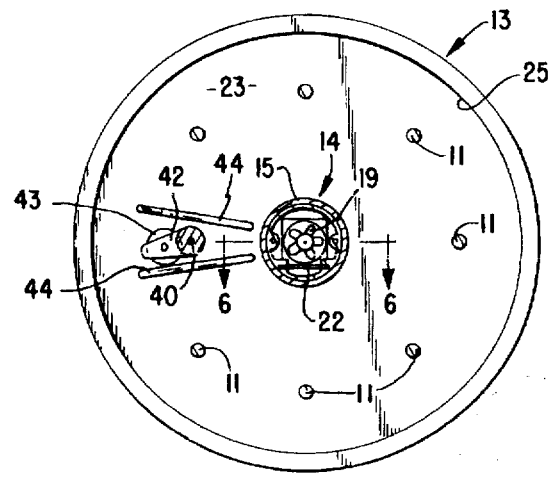
FIG. 5 is a sectional view from line 5—5 of FIG. 4.

Automatic turning may be achieved by a device also disclosed herein, and shown best in FIGS. 4 and 5. For the desired purpose, a small motor 20 is mounted on the underside of the base 10. The shaft 40 of the motor extends upward through the base. A crank member 42 is fixed to the upper end of that shaft and extends outwardly to support a roller 43, preferably rotatably mounted on a part of the crank member 42 remote from the shaft 40.

The roller 43 lies between a pair of radial ribs 44 formed on the floor 23 of the container 13. These ribs extend downwardly to embrace the roller 43 and then will be contacted by the roller as it is carried by the crank arm 42. Such contact would lead to a reciprocating motion of the container 13 about the tower 14 as an axis. Such motion would be similar to the manually induced motion described above and would therefore tend to roll the eggs between the stationary spokes 32. The crank member 42 may be proportioned to achieve adequate motion of the container 13 to achieve the desired amount of rotating motion to insure proper rolling of the eggs. It will be understood that either manual switching or automatically timed switching may be used to control the operation of this motor 20.

Thus, there is provided a convenient table-top incubator which can be fully automatic in its operation.

I claim as my invention:

1. A table-top incubator for hatching eggs comprising a base, central member on said base, said central member including means to provide heat for air, and means to provide circulation of air, container means surrounding said central member and rotatable about said central member and slidable relative to said base, said container means providing a support for said eggs, and turning means held stationary by said central member adapted to roll said eggs as said support is moved relative to said central member.

2. The incubator of claim 1 in which said means to provide heating includes an incandescent electric bulb.

3. The incubator of claim 2 in which said means to provide circulation of air includes a fan in said central member below said bulb whereby said fan blows upward through said central member and past said bulb.

4. The incubator of claim 3 in which said container includes a bottom having an opening surrounding said central member, a cylindrical side wall extending upward from said bottom, and a removable cover fitted to said side wall.

5. The incubator of claim 4 in which said cover is formed with a central downwardly extending dimple whereby said fan blows said air against said dimple which in turn distributes said blown air against said cylindrical side wall.

6. The incubator of claim 1 in which said central member provides openings both at the bottom and the top thereof, said openings at the bottom being at least equal in area to the openings at the top of said central member.

7. The incubator of claim 1 in which said base is formed with a plurality of posts, said container having a bottom slidably supported by said posts.

8. The incubator of claim 1 in which said container includes a bottom adapted to surround said central member, ribs formed on said bottom and within said container, said support for said eggs including screen support floor set on said ribs and on which said eggs may rest, said support floor being thus spaced from the bottom of said container.

9. The incubator of claim 8 in which a wheel having radial spokes is removably mounted on said central member above said screen support floor, said eggs being supported on said screen support floor between said spokes, movement of said container and said support floor thereby being effective to cause said eggs to engage said spokes and be rolled thereby.

10. The incubator of claim 9 in which motor is mounted on said base, crank member adapted to driven by said motor, said crank member being disposed between said base and said container, said ribs formed on said bottom of said container and straddling a part of said crank member whereby rotation of said crank member operates to oscillate said container.

11. The incubator of claim 9 in which said wheel includes a central hub, said spokes radiating from said hub, said hub extending axially away from said spokes by a substantially larger distance on one side of said spokes than on the other, said wheel being invertible on said central member whereby the spacing of said spokes above said support floor provides selective spacing for different sizes of eggs.

12. The incubator of claim 8 which motor is mounted on said base, operating means between said container and said motor whereby said motor operates to oscillate said container means.

13. The incubator of claim 8 in which motor is mounted on said base, crank member adapted to driven by said motor, said crank member being disposed between said base and said container, said ribs formed on said bottom of said container and straddling a part of said crank member whereby rotation of said crank member operates to oscillate said container.

* * * * *